(12) United States Patent
Montojo et al.

(10) Patent No.: US 10,419,197 B2
(45) Date of Patent: Sep. 17, 2019

(54) SHARING OF LONG-TERM EVOLUTION (LTE) UPLINK SPECTRUM

(71) Applicant: QUALCOMM Incorporated, San Diego, CA (US)

(72) Inventors: Juan Montojo, San Diego, CA (US); Yeliz Tokgoz, San Diego, CA (US); Valentin Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/847,214

(22) Filed: Dec. 19, 2017

(65) Prior Publication Data
US 2018/0316481 A1 Nov. 1, 2018

Related U.S. Application Data

(60) Provisional application No. 62/491,013, filed on Apr. 27, 2017.

(51) Int. Cl.
| | |
|---|---|
| *H04W 4/00* | (2018.01) |
| *H04L 5/14* | (2006.01) |
| *H04B 7/26* | (2006.01) |
| *H04W 74/00* | (2009.01) |
| *H04L 5/00* | (2006.01) |
| *H04W 74/08* | (2009.01) |
| *H04W 48/12* | (2009.01) |

(52) U.S. Cl.
CPC .............. *H04L 5/14* (2013.01); *H04B 7/265* (2013.01); *H04L 5/003* (2013.01); *H04L 5/0007* (2013.01); *H04W 74/004* (2013.01); *H04W 74/0833* (2013.01); *H04W 48/12* (2013.01)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

| | | | |
|---|---|---|---|
| 2010/0260136 A1 | 10/2010 | Fan et al. | |
| 2011/0299511 A1* | 12/2011 | Cook | H04W 84/105 370/338 |

(Continued)

FOREIGN PATENT DOCUMENTS

WO    WO-2016068644 A1    5/2016

OTHER PUBLICATIONS

International Search Report and Written Opinion—PCT/US2018/024956—ISA/EPO—dated Jun. 21, 2018.

*Primary Examiner* — Siren Wei
(74) *Attorney, Agent, or Firm* — Haynes and Boone, LLP

(57) ABSTRACT

Wireless communications systems and methods related to performing initial network access procedures using shared resources are provided. A first wireless communication device transmits, in a first frequency band, a random access request to a first network. The first wireless communication device receives, in response to the random access request, a random access response from a second wireless communication device of the first network. The random access response is in a second frequency band allocated to the first network for time-division duplexing (TDD) communications. The second frequency band is different than the first frequency band.

22 Claims, 8 Drawing Sheets

(56) References Cited

U.S. PATENT DOCUMENTS

| | | | |
|---|---|---|---|
| 2012/0020322 A1* | 1/2012 | Fan | H04W 72/0453 |
| | | | 370/330 |
| 2012/0063302 A1 | 3/2012 | Damnjanovic et al. | |
| 2013/0258882 A1 | 10/2013 | Dinan | |
| 2014/0349645 A1* | 11/2014 | Webb | H04L 5/0091 |
| | | | 455/435.1 |
| 2016/0050667 A1* | 2/2016 | Papasakellariou | H04L 5/0053 |
| | | | 370/329 |
| 2016/0330766 A1* | 11/2016 | Liu | H04W 28/18 |
| 2017/0117991 A1* | 4/2017 | Liu | H04L 1/0006 |
| 2017/0181057 A1* | 6/2017 | Kishiyama | H04W 48/10 |
| 2018/0020483 A1* | 1/2018 | Lee | H04W 48/16 |

\* cited by examiner

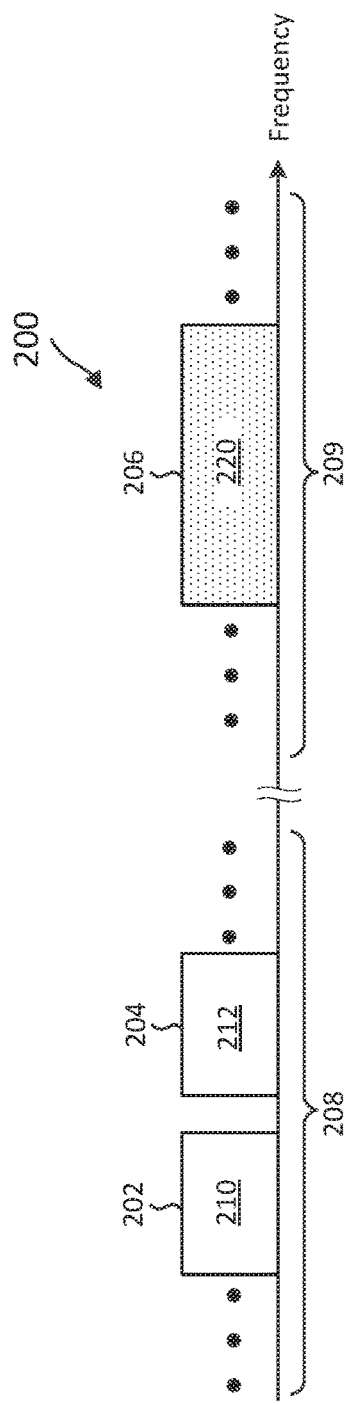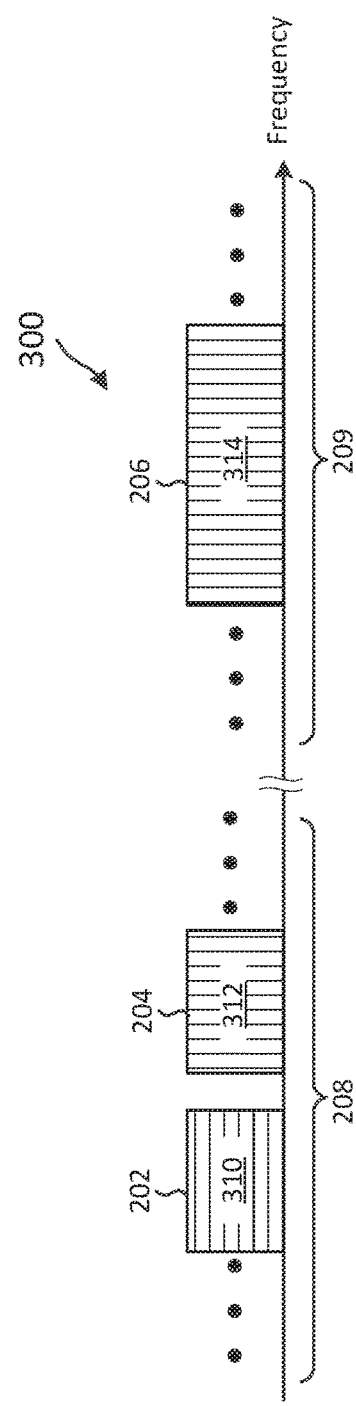

SHARING OF LONG-TERM EVOLUTION (LTE) UPLINK SPECTRUM

CROSS REFERENCE TO RELATED APPLICATIONS

The present application claims priority to and the benefit of the U.S. Provisional Patent Application No. 62/491,013, filed Apr. 27, 2017, which is hereby incorporated by reference in its entirety as if fully set forth below and for all applicable purposes.

TECHNICAL FIELD

The technology discussed in this disclosure relates generally to wireless communication systems, and more particularly to allowing a radio access network (RAN) to use an additional component carrier for uplink (UL) communications. Embodiments enable and provide solutions and techniques for improving resource utilization efficiency and UL coverage.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded connectivity, wireless communication technologies or radio access technologies are advancing from the LTE technology to a next generation new radio (NR) technology. One technique for expanding connectivity may be to extend the frequency operation range to higher frequencies since the lower frequencies are becoming over-crowded. For example, LTE may operate between a low-frequency range (e.g., below 1 gigahertz (GHz)) to a mid-frequency range (e.g., between about 1 GHz to about 3 GHz) and the next generation NR may operate in a high-frequency range (e.g., between about 3 GHz to about 30 GHz).

While LTE deployments continue to grow and expand and in transition to the next generation NR, the support for coexistence between LTE and NR may be important. One approach to providing coexistence is to continue to operate LTE devices over LTE component carriers and additionally operate NR devices over NR component carriers separate from the LTE component carriers. Another approach is to allow dual connectivity over LTE and NR, where a device supporting both LTE and NR connectivity can gain initial access to an LTE network via an LTE primary cell (PCell) (e.g., on LTE component carriers) and subsequently be configured to add a secondary cell (SCell) (e.g., on an NR component carrier) for NR operations. As such, dual-connectivity devices can take advantage of both LTE and NR component carriers, whereas NR devices are limited to operate over NR component carriers.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for a user equipment (UE) of a particular time-division duplexing (TDD) radio access technology (e.g., a new radio (NR)-based technology) to gain initial network access via an additional component carrier, such as a long-term-evolution (LTE) uplink (UL) component carrier. For example, an NR network may operate in a TDD mode and pair a higher frequency NR component carrier with one or more lower frequency component carriers. An NR base station (BS) may indicate random access resources in a lower frequency UL component carrier. An NR UE may transmit a random access request using the lower frequency UL component carrier based on the indication. The random access procedure may be completed using the lower frequency UL component carrier for UL communications and using a higher frequency NR component carrier for DL communications. Upon completion, the NR BS may configure the NR UE to continue to use the lower frequency UL component carrier or switch to the higher frequency NR component carrier for UL communications.

For example, in an aspect of the disclosure, a method of wireless communication including transmitting, by a first wireless communication device in a first frequency band, a random access request to a first network; and receiving, by the first wireless communication device in response to the random access request, a random access response from a second wireless communication device of the first network, wherein the random access response is in a second frequency band allocated to the first network for time-division duplexing (TDD) communications, the second frequency band being different than the first frequency band.

In an additional aspect of the disclosure, a method of wireless communication including receiving, by a first wireless communication device from a second wireless communication device in a first frequency band, a random access request to a first network; and transmitting, by the first wireless communication device to the second wireless communication device in response to the random access request, a random access response, wherein the random access response is in a second frequency band allocated to the first network for time-division duplexing (TDD) communications, the second frequency band being different than the first frequency band.

In an additional aspect of the disclosure, an apparatus including a transceiver configured to transmit, in a first frequency band, a random access request to a first network; and receive, in response to the random access request, a random access response from a second wireless communication device of the first network, wherein the random access response is in a second frequency band allocated to the first network for time-division duplexing (TDD) communications, the second frequency band being different than the first frequency band.

In an additional aspect of the disclosure, an apparatus including a transceiver configured to receive, from a second wireless communication device in a first frequency band, a random access request to a first network; and transmit, to the second wireless communication device in response to the random access request, a random access response, wherein the random access response is in a second frequency band allocated to the first network for time-division duplexing (TDD) communications, the second frequency band being different than the first frequency band.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 2 illustrates a frequency band usage scenario for operating long-term evolution (LTE) devices and new radio (NR) devices according to embodiments of the present disclosure.

FIG. 3 illustrates a frequency band usage scenario for operating dual-connectivity devices according to embodiments of the present disclosure.

DETAILED DESCRIPTION

Figure 1:
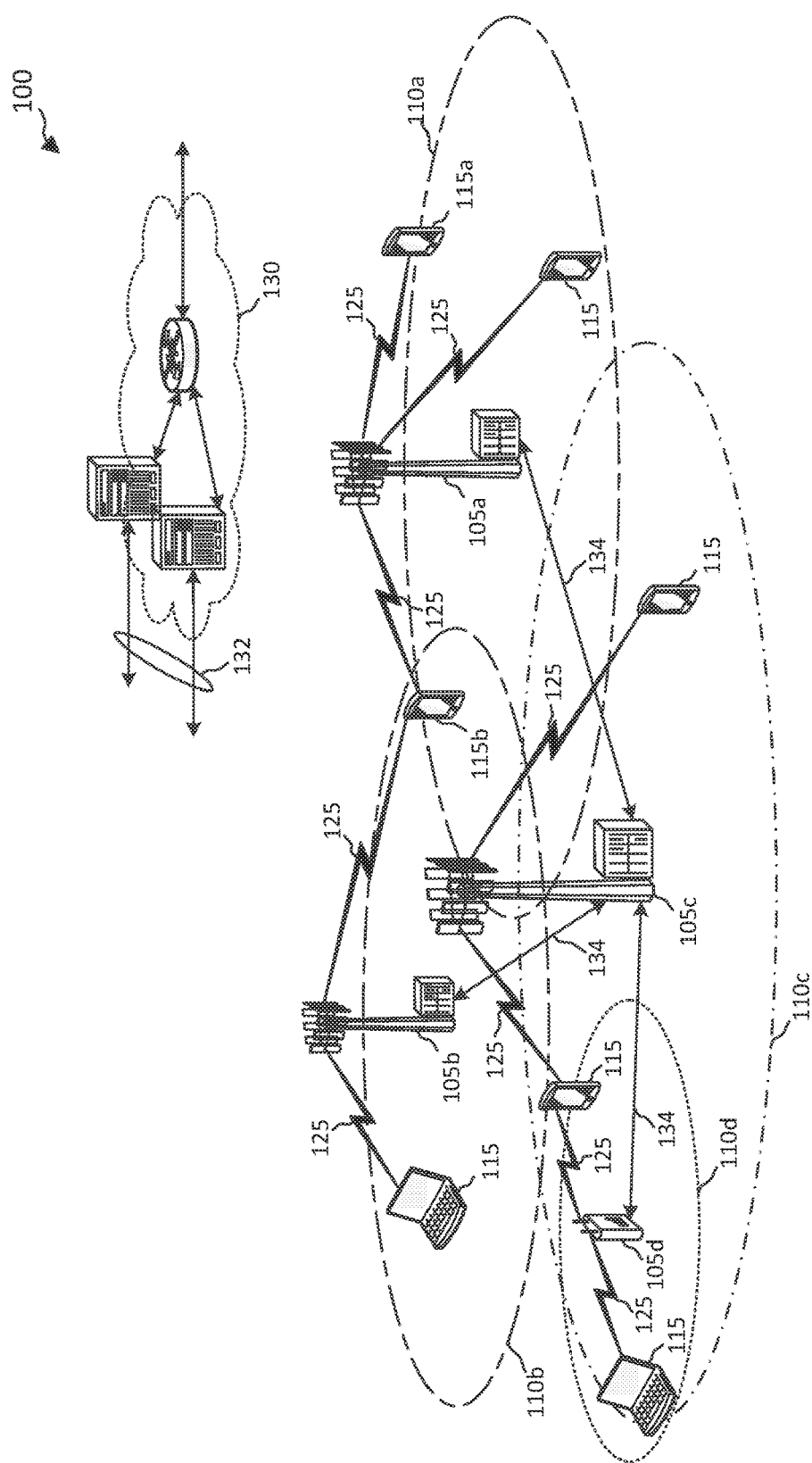
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWave bands) network.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The present disclosure describes mechanisms for an NR network to use an additional component carrier or frequency band for UL communications. In some disclosed embodiments, an NR network may operate over an NR frequency band paired with one or more additional UL frequency bands (e.g., LTE UL frequency bands). The NR network may operate in a TDD mode. The NR frequency band may be located at higher frequencies than the additional UL frequency bands. The NR frequency band may include frequencies higher than a frequency threshold (e.g., at about 3 GHz). The additional UL frequency bands may include frequencies lower than the frequency threshold. A BS of the NR network may broadcast system information including a random access configuration. The random access configuration may indicate resources for performing a random access procedure to gain initial access to the NR network. The random access resources may be in one of the additional UL frequency bands.

To gain initial access to the NR network, a UE may transmit a random access request (e.g., a random access preamble signal), The random access request may be in the additional UL frequency band and the BS may respond by transmitting a random access response in the NR frequency band. Subsequently, the UE may transmit a connection request in the additional UL frequency band to establish a connection with the BS. The BS may respond by transmitting a connection response in the NR frequency band. After establishing a connection, the BS may reconfigure the UE to use the NR frequency band for UL communications or configure the UE to continue to use the additional UL frequency band for UL communications. In some embodiments, when the one or more UL frequency bands are shared with another network (e.g., as an LTE network), the NR BS may negotiate or coordinate with the other network to gain access to the additional frequency bands.

Aspects of the present disclosure can provide several benefits. For example, sharing LTE UL frequency bands can allow an NR network to use available resources in LTE UL frequency bands that may otherwise be underutilized. In addition, NR frequency bands may have high path loss and may be less stable than the LTE UL frequency bands due to high frequencies. Thus, the use of the lower frequency LTE UL frequency band or additional lower frequency UL frequency bands for UL communications during the initial network access procedure can improve NR network UL coverage. The disclosed embodiments allow for coexistence between NR networks and LTE networks. The disclosed embodiments can minimize changes in the NR physical layer for supporting coexistence. The disclosed embodiments may not have significant impact to legacy LTE devices operating over LTE component carriers. The disclosed embodiments can also support dual-connectivity devices that support simultaneous LTE and NR connections.

While the disclosed embodiments are described in the context of an NR network sharing LTE UL resources, implementations may occur in other scenarios too. For example, some disclosed embodiments may be applied to enable a TDD network to utilize an additional UL frequency band, which may or may not be shared with another network, to improve UL coverage. Thus, in some instances, the LTE UL frequency bands may refer to UL frequency bands without the deployment of an LTE network.

FIG. 1 illustrates a wireless communication network 100 according to embodiments of the present disclosure. The network 100 includes BSs 105, UEs 115, and a core network 130. The network 100 may be a cellular network or a non-cellular wireless network. For example, the network 100 may be a LTE network, a LTE-A network, a millimeter wave (mmW) network, a new radio (NR) network, a 5G network, P2P network, mesh network, D2D where devices communication with each other, or any other successor network to LTE. Alternatively, the network 100 may be a unified network supporting multiple radio access technologies (RATs), such as both LTE and NR. A BS 105 may be a station that communicates with the UEs 115 and may also be referred to as a base transceiver station, a node B, an Evolved Node B (eNodeB) or a next Generation Node B (gNB), an access point, and the like.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an entertainment device, medical device, wearable device, industrial equipment, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, the BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access.

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 105 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the network 100 may be a unified network supporting both LTE and NR. In such embodiments, the network 100 may operate over an LTE spectrum or LTE component carriers and an NR spectrum or NR component carriers. The LTE spectrum may include low-frequency bands that are below 1 GHz and mid-frequency bands that are between about 1 GHz to about 3 GHz. The NR spectrum may include sub-6 GHz frequency bands and millimeter wave bands. The BSs 105 may include LTE BSs and NR BSs. In some embodiments, LTE BSs and NR BSs may be co-located. For example, the BSs 105 may employ the same hardware to implement both LTE and NR by executing different software components or stacks for LTE and NR. In addition, the UEs 115 may include standalone LTE devices and standalone NR devices. Standalone LTE devices support LTE connectivity, but not NR. Conversely, standalone NR devices support NR connectivity, but not LTE. Alternatively, some UEs 115 may support dual LTE-NR connectivity. The communication mechanisms and frequency band plans for the various combinations of connectivity are described in greater detail herein.

FIGS. 2 and 3 illustrate frequency band plans that may be employed by the network 100 to support LTE-NR coexistence in an area. In FIGS. 2 and 3, the x-axes represent frequencies in some constant units.

FIG. 2 illustrates a frequency band usage scenario 200 for operating LTE devices and NR devices according to embodiments of the present disclosure. The standalone or legacy LTE devices and the standalone NR devices may correspond to the UEs 115. The standalone LTE devices may communicate with LTE BSs similar to the BSs 105 based on the LTE communication protocol for initial network access and subsequent normal operations. The standalone NR devices may communicate with NR BSs similar to the BSs 105 based on the NR communication protocol for initial network access and subsequent normal operations.

The scenario 200 includes an LTE UL component carrier or frequency band 202, an LTE DL component carrier or frequency band 204 and an NR component carrier or frequency band 206. The LTE frequency bands 202 and 204 are in a frequency range 208, which may be between about 700 megahertz (MHz) to about 3 GHz. The LTE UL frequency band 202 is typically located at lower frequencies than the LTE DL frequency band 204. The NR frequency band 206 is in a frequency range 209, which may be in a sub-6 GHz band or a millimeter wave band. In some embodiments, the LTE UL frequency band 202 may be located below 1 GHz, the LTE DL frequency band 204 may be located around 2 GHz, and the NR frequency band 206 may be located around 3.5 GHz. While FIG. 2 illustrate one LTE UL frequency band 202, one LTE DL frequency band 204, and one NR frequency band 206 for purposes of simplicity of discussion, though it will be recognized that embodiments of the present disclosure may scale to many more LTE UL frequency bands 202 and/or LTE DL frequency bands 204 in the frequency range 208 and/or many more NR frequency bands 206 in the frequency range 209.

The LTE UL frequency band 202 and the LTE DL frequency band 204 may be used by an LTE network for LTE communications in a frequency-division duplexing (FDD) mode. For example, the LTE UL frequency band is used for LTE UL communications 210. The LTE DL frequency band 204 is used for LTE DL communications 212. A standalone LTE device may initiate an access to the LTE network by transmitting a random access request in the frequency band 202 and an LTE BS of the network may respond by transmitting a random access response in the frequency band 204. Subsequently, the LTE device may transmit a connection request in the frequency band 202 and the LTE BS may respond with a connection response in the frequency band 204. After establishing a connection, the LTE BS and the LTE device may communicate over the frequency bands 202 and 204.

The NR frequency band 206 may be used by an NR network for NR communications 220 in a time-division duplexing (TDD) mode. A standalone NR device may initiate an access to the NR network by transmitting a random access request in the frequency band 206 in a UL period or subframe and an NR BS of the network may respond by transmitting a random access response in the frequency band 206 during a DL period or subframe. Subsequently, the NR device may transmit a connection request in the frequency band 206 during a UL period and the NR BS may respond with a connection response in the frequency band 206 during a DL period. After establishing a connection, the NR BS and the NR device may communicate over the frequency bands 206 according to a TDD subframe configuration.

FIG. 3 illustrates a frequency band usage scenario 300 for operating dual-connectivity devices according to embodiments of the present disclosure. The scenario 300 includes a similar frequency band configuration as the scenario 200, but illustrates the use of the LTE frequency bands 202 and 204 and the NR frequency band 206 to support dual LTE-NR connectivity. While FIG. 3 illustrate one LTE UL frequency band 202, one LTE DL frequency band 204, and one NR frequency band 206 for purposes of simplicity of discussion, though it will be recognized that embodiments of the present disclosure may scale to many more LTE UL frequency bands 202 and/or LTE DL frequency bands 204 in the frequency range 208 and/or many more NR frequency bands 206 in the frequency range 209.

In the scenario 300, the LTE frequency bands 202 and 204 may be designated for use by an LTE primary cell (PCell) and the NR frequency band 206 may be designated for use by a secondary cell (SCell). A dual LTE-NR device similar to the UEs 115 may initiate an initial network access over the LTE PCell. For example, the dual LTE-NR may employ similar mechanisms as the standalone LTE device described above, where random access and connection requests (e.g., LTE UL communications 310) and responses (e.g., LTE DL communications 312) may be exchanged over the frequency bands 202 and 204, respectively. After gaining access to the network in the PCell, the network can configure the dual LTE-NR device to add an SCell for DL communications 314 over the NR frequency band 206.

Figure 4:
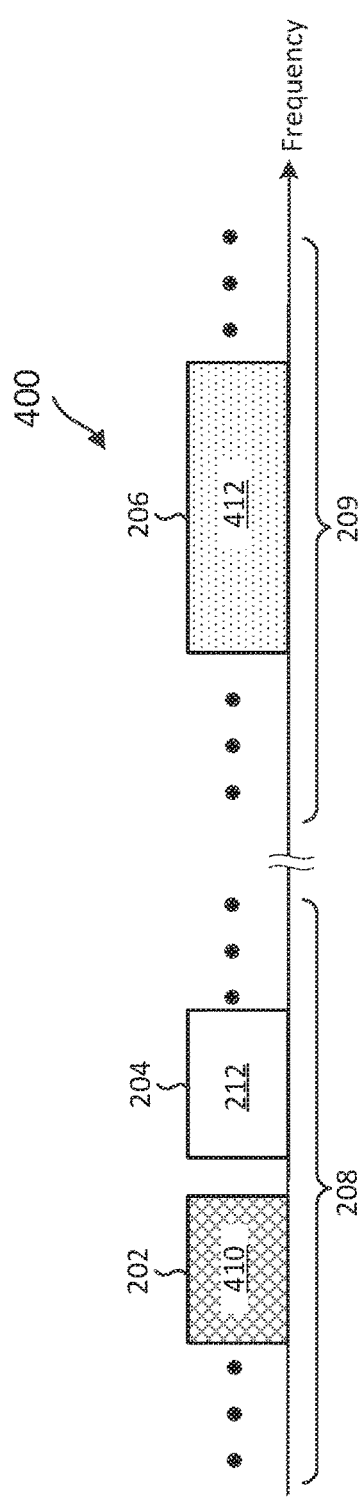
FIG. 4 illustrates an initial NR network access method that shares an LTE uplink (UL) frequency spectrum according to embodiments of the present disclosure.
Figure 5:
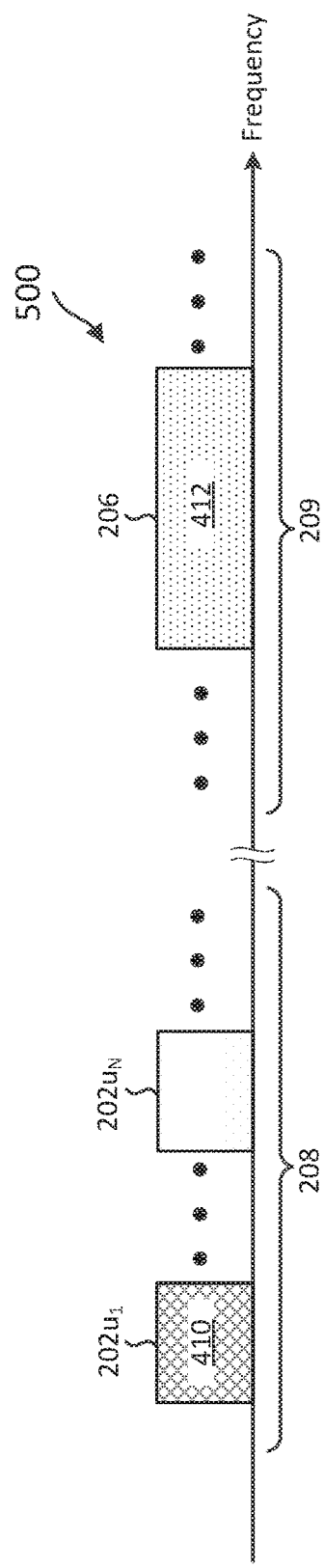
FIG. 5 illustrates an initial NR network access method that shares an LTE UL frequency spectrum according to embodiments of the present disclosure.

Some studies show that LTE UL spectrums may be underutilized. Thus, allowing NR networks to share the LTE UL spectrums may improve spectrum or resource utilization efficiency. In addition, NR networks typically operate over high-frequency bands or millimeter wave bands with significantly higher path loss than the LTE mid-frequency bands or LTE low-frequency bands. The high path loss may cause difficulties for UEs such as the UEs 115 to gain initial access or establish connections with BSs such as the BSs 105 in NR networks. Thus, allowing NR devices or UEs to initiate a network access over the LTE UL spectrums may improve UL coverage. FIGS. 4 and 5 illustrate various mechanisms for standalone NR devices to access an NR network using a shared LTE UL frequency spectrum. In FIGS. 4 and 5, the x-axes represent frequencies in some constant units.

FIG. 4 illustrates an initial NR network access method 400 that shares an LTE UL frequency spectrum according to embodiments of the present disclosure. The method 400 is described in the context of a similar frequency band configuration as the scenarios 200 and 300. However, in the method 400, the LTE UL frequency band 202 is shared between an LTE network and an NR network. While FIG. 4 illustrate one LTE UL frequency band 202, one LTE DL frequency band 204, and one NR frequency band 206 for purposes of simplicity of discussion, though it will be recognized that embodiments of the present disclosure may scale to many more LTE UL frequency bands 202 and/or LTE DL frequency bands 204 in the frequency range 208 and/or many more NR frequency bands 206 in the frequency range 209.

For example, the LTE frequency bands 202 and 204 are designated to or licensed by the LTE network and the NR frequency band 206 is designated to or licensed by the NR network. In some embodiments, the NR network operator may have an agreement with the LTE network operator to share the LTE UL frequency band 202 for NR UL communications. In some other embodiments, the same operator may operate both the NR network and the LTE network. The NR BSs and LTE BSs may coordinate with each other to share the LTE UL subframes in the LTE UL frequency band 202. The coordination may be performed via a backhaul connection or via a central authority. The NR network may communicate UL communications 410 in the LTE UL frequency band 202 based on the coordination and communicate DL communications 412 the NR frequency band 206. The LTE network may communicate UL communications similar to the UL communications 210 (not shown) in the LTE UL frequency band 202 based on the coordination and communicates DL communications 212 in the LTE DL frequency band 204.

In an embodiment, a standalone NR device similar to the UEs 115 may perform a random access procedure to establish a connection with an NR BS of the NR network using the LTE UL frequency band 202 and the NR frequency band 206. The NR network may broadcast random access configuration information indicating the NR frequency band 206 and certain resources in the LTE UL frequency band 202. A standalone NR device listens to the random access configuration information and transmits a random access request in the LTE UL frequency band 202 accordingly. In response, the NR BS transmits a random access response in the NR frequency band 206. Subsequently, the NR device may transmit a connection request in the LTE UL frequency band 202 and the NR BS may respond with a connection response in the NR frequency band 206. After establishing a connection, the NR BS may configure the NR device to communicate over the LTE UL frequency bands 202 and/or the NR frequency band 206 for UL communications. The use of the LTE UL frequency band 202 for initial NR network access is described in greater detail herein.

FIG. 5 illustrates an initial NR network access method 500 that shares an LTE UL frequency spectrum according to embodiments of the present disclosure. The method 500 is similar to the method 400. However, in the method 500, an NR network may pair multiple LTE UL frequency bands 202 of one or more LTE networks with the NR frequency band 206. As shown, the LTE frequency range 208 includes a plurality of LTE UL frequency bands 202 (e.g., shown as $202u_1$ to $202u_N$) that may be paired with the NR frequency band 206. The LTE frequency range 208 may include additional LTE UL frequency bands and/or LTE DL frequency bands similar to the LTE DL frequency bands 204. Similarly, the NR frequency range 209 may include additional NR frequency bands similar to the NR frequency bands 206.

In an embodiment, an NR BS of the NR network may broadcast random access configuration information indicating the NR frequency band 206 and resources in multiple LTE UL frequency bands 202. A standalone NR device capable of operating in the LTE UL frequency bands 202 may select a resource from one of the LTE UL frequency bands 202 for an initial network access. As an example, the standalone NR device may select a resource from the LTE UL frequency band $202u_1$ to transmit a random access request (e.g., the UL communications 410). Similar to the method 400, the NR BS may respond by transmitting a random access response (e.g., the DL communications 412) in the NR frequency band 206. The random access response may indicate a transmission resource in one of the LTE UL frequency bands 202 allocated for the NR device. For example, the transmission resource may be in the same LTE UL frequency band $202u_1$ or a different LTE UL frequency band (e.g., the LTE UL frequency band $202u_N$). The NR device may transmit a connection request (e.g., the UL communications 410) using the allocated transmission resource. The NR BS may respond with a connection response (e.g., the DL communications 412) in the NR frequency band 206.

Figure 6:
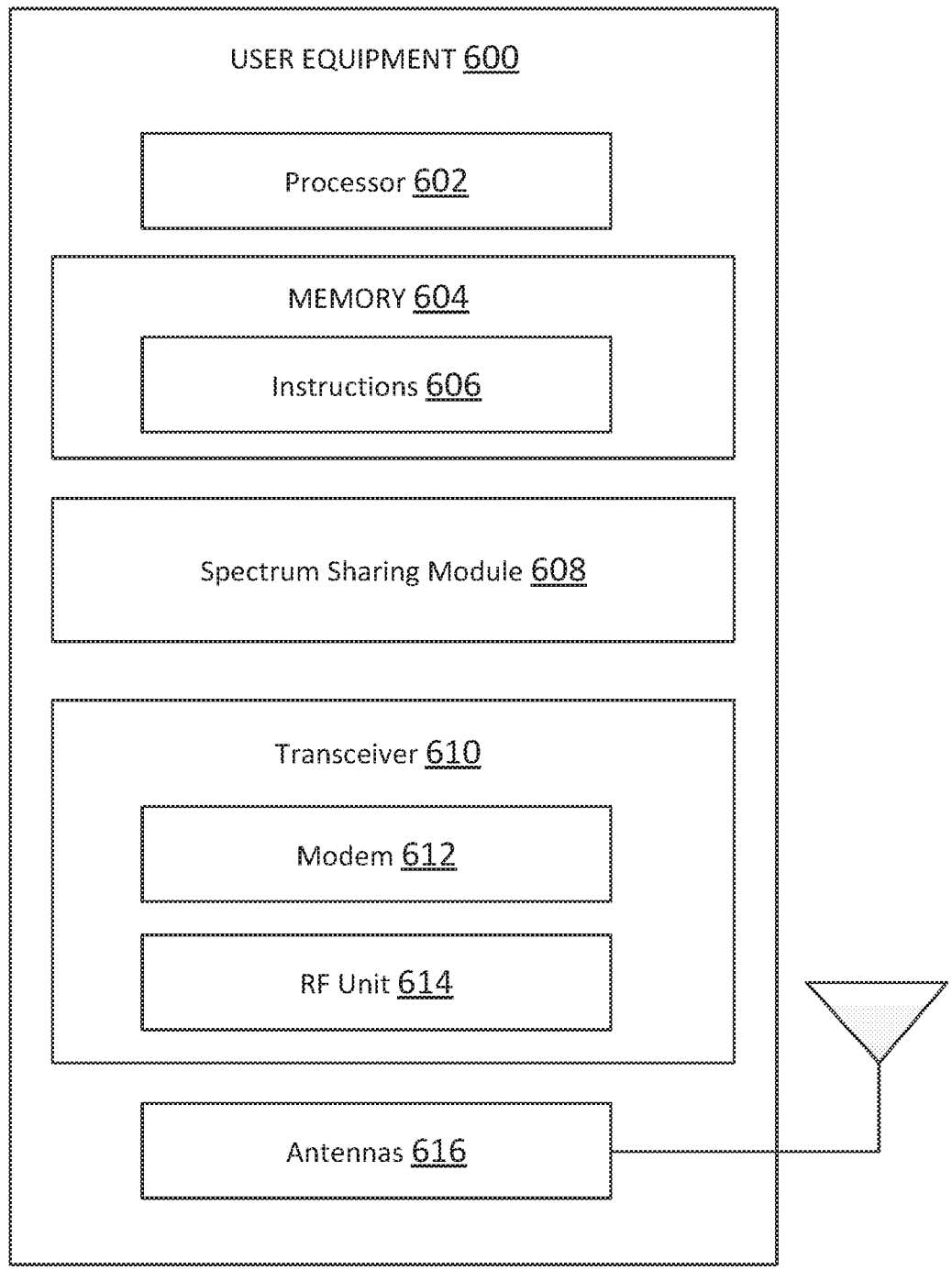
FIG. 6 is a block diagram of an exemplary user equipment (UE) according to embodiments of the present disclosure.

FIG. 6 is a block diagram of an exemplary UE 600 according to embodiments of the present disclosure. The UE 600 may be a UE 115 as discussed above. As shown, the UE 600 may include a processor 602, a memory 604, a spectrum sharing module 608, a transceiver 610 including a modem subsystem 612 and a radio frequency (RF) unit 614, and an antenna 616. These elements may be in direct or indirect communication with each other, for example via one or more buses.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with embodiments of the present disclosure. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 608 may be implemented via hardware, software, or combinations thereof. For example, the spectrum sharing module 608 may be implemented as a processor, circuit, and/or instructions 606 stored in the memory 604 and executed by the processor 602. The spectrum sharing module 608 may be used for various aspects of the present disclosure. For example, the spectrum sharing module 608 is configured to listen to the network for system information broadcast. The system information may indicate random access resources in shared LTE UL frequency bands such as the LTE UL frequency bands 202. The spectrum sharing module 608 is further configured to perform initial network access by transmitting random access requests and connection requests in the LTE UL frequency bands and receiving random access responses and connection responses from an NR frequency band such as the NR frequency band 206 as described above with respect to the methods 400 and 500 and as described in greater detail herein. The spectrum sharing module 608 is further configured to receive UL data transmission configurations and perform UL data transmissions according to the received UL data transmission configurations.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the spectrum sharing module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of channel reservation signals according to embodiments of the present disclosure. The antenna 616 may further receive data messages transmitted from other devices. This may include, for example, reception of channel reservation signals according to embodiments of the present disclosure. The antenna 616 may provide the received data messages for processing and/or demodulation at the transceiver 610. Although FIG. 6 illustrates antenna 616 as a single antenna, antenna 616 may include multiple antennas of similar or different designs in order to sustain multiple transmission links. The RF unit 614 may configure the antenna 616.

Figure 7:
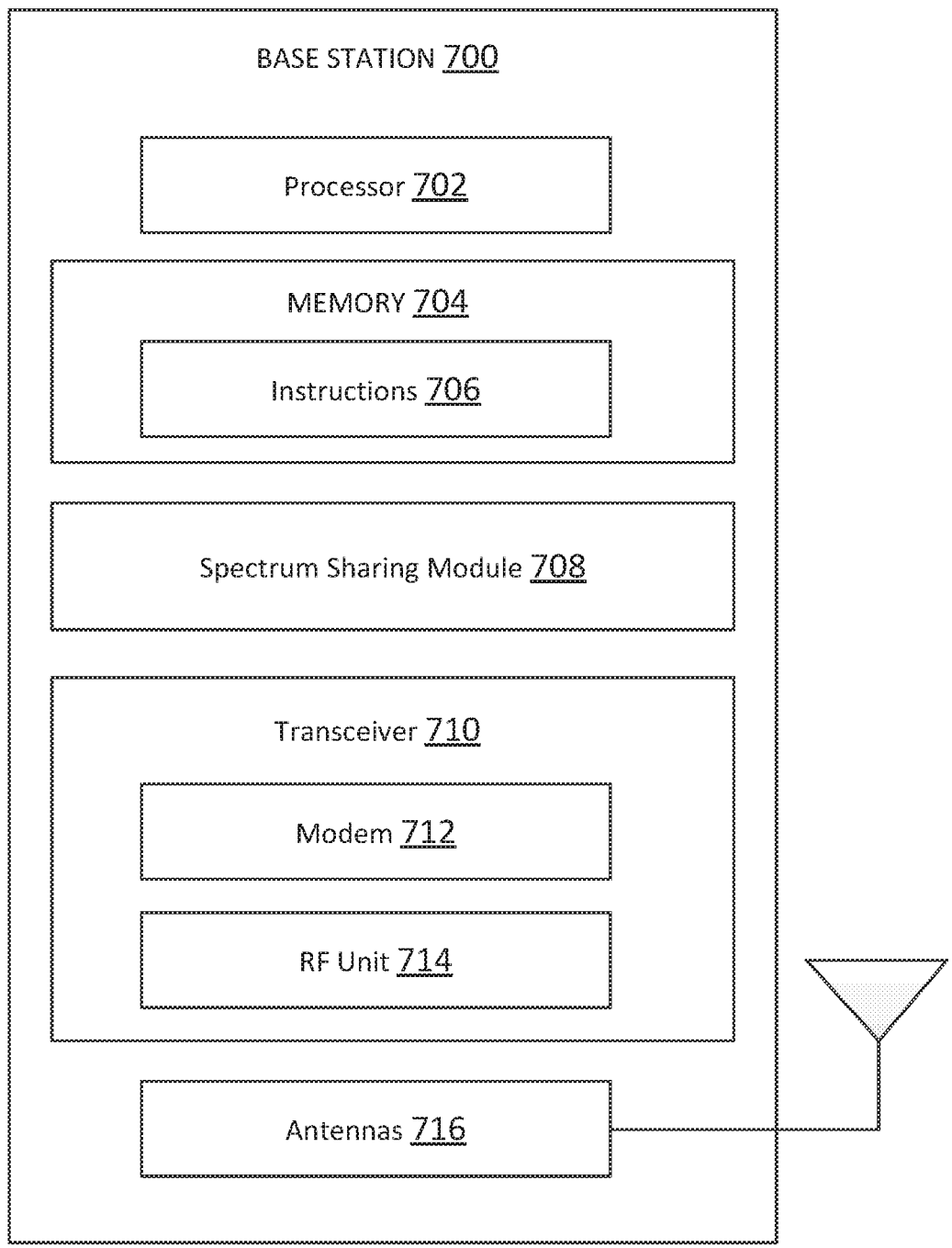
FIG. 7 is a block diagram of an exemplary base station (BS) according to embodiments of the present disclosure.

FIG. 7 is a block diagram of an exemplary BS 700 according to embodiments of the present disclosure. The BS 700 may be a BS 105 as discussed above. A shown, the BS 700 may include a processor 702, a memory 704, a spectrum sharing module 708, a transceiver 710 including a modem subsystem 712 and a RF unit 714, and an antenna 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 7.

The spectrum sharing module 708 may be implemented via hardware, software, or combinations thereof. For example, the spectrum sharing module 708 may be implemented as a processor, circuit, and/or instructions 706 stored in the memory 704 and executed by the processor 702. The spectrum sharing module 708 may be used for various aspects of the present disclosure. For example, the spectrum sharing module 708 is configured to coordinate with LTE BSs such as the BSs 105 for access to an LTE UL spectrum or one or more LTE UL frequency bands such as the LTE UL frequency bands 202 and/or receive rules and/or protocols for sharing an LTE UL spectrum. The spectrum sharing module 708 is further configured to configure resources in LTE UL frequency bands and broadcast system information indicating the configured resources. The system information may include random access configuration information, such as random access resources, random access preamble configurations, and/or random access rules. The spectrum sharing module 708 is further configured to monitor for random access requests or random access preambles in the configured random access resources, for example, in LTE UL frequency bands, respond to random access requests in an NR frequency band such as the NR frequency band 206, configure resources for connection requests, and respond to connection requests in the NR frequency band, as described in greater detail herein.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115. The RF unit 714 may be further configured to perform analog beamforming in conjunction with the digital beamforming. Although shown as integrated together in transceiver 710, the modem subsystem 712 and the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of information to complete attachment to a network and communication with a camped UE 115 according to embodiments of the present disclosure. The antenna 716 may further receive data messages transmitted from other devices and provide the received data messages for processing and/or demodulation at the transceiver 710.

Although FIG. 7 illustrates antenna 716 as a single antenna, antenna 716 may include multiple antennas of similar or different designs in order to sustain multiple transmission links.

Figure 8:
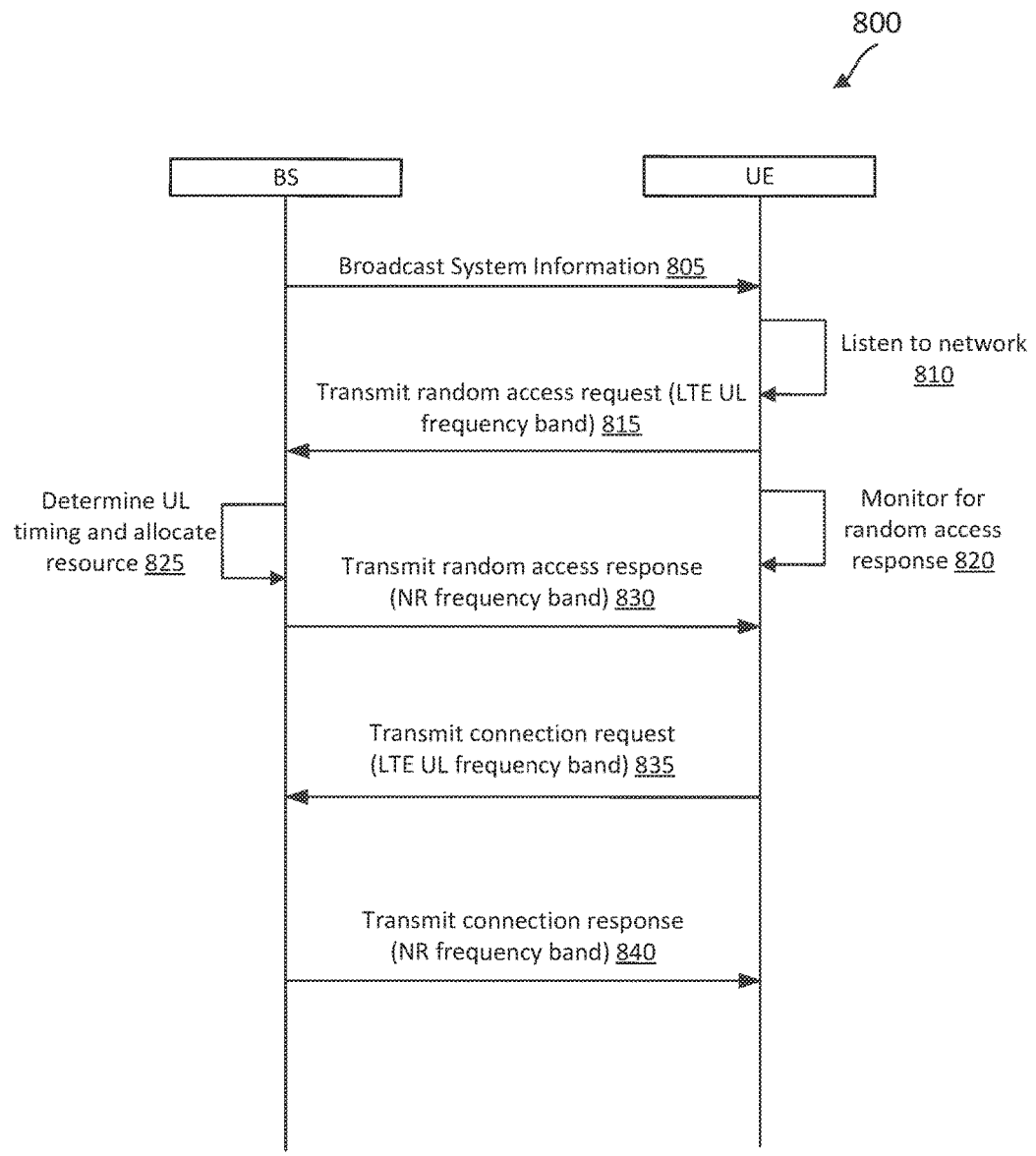
FIG. 8 illustrates a signaling diagram of a method for performing an initial access to an NR network using an LTE UL frequency band according to embodiments of the present disclosure.

FIG. 8 illustrates a signaling diagram of a method 800 for performing an initial access to an NR network using an LTE UL frequency band according to embodiments of the present disclosure. Steps of the method 800 can be executed by computing devices (e.g., a processor, processing circuit, and/or other suitable component) of wireless communication devices, such as the BSs 105 and 700 and the UEs 115 and 600. The method 800 can be better understood with reference to FIGS. 4 and 5. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates one NR BS and one standalone NR UE for purposes of simplicity of discussion, though it will be recognized that embodiments of the present disclosure may scale to many more UEs and/or BSs.

At step 805, a BS of an NR network (e.g., the network 100) broadcasts system information associated with the NR network in an NR frequency band (e.g., the NR frequency band 206). The NR network may employ a similar frequency band plan as in the methods 400 and 500 described above with respect to FIGS. 4 and 5, respectively. The system information may include cell access related information, channel configuration information (e.g., bandwidth and frequency bands of LTE UL and/or NR frequency bands), physical random access (PRACH) configuration information, and/or neighboring cell information. The PRACH configuration information may indicate sequences, formats, resources, and/or other information for random access preamble transmissions. The random access resources may be located in one or more LTE UL frequency bands (e.g., the LTE UL frequency bands 202) of one or more LTE networks. For example, the NR BS may negotiate with the LTE networks for sharing the LTE UL frequency bands. The NR BS may coordinate with the LTE networks to determine the random access resources in the LTE UL frequency bands. In some embodiments, the random access resources may also include resource in the NR frequency band to enable NR devices that cannot operate over LTE UL frequency bands to continue to operate over the NR frequency band. In other words, the BS may provide NR devices the option to select from random access resources the NR frequency band or the LTE UL frequency bands.

At step 810, a UE attempting to access the NR network listens to the network for system information. In some embodiments, the UE may not be connected to any of the LTE networks. In some embodiments, the UE may be a standalone NR UE that does not support LTE connectivity.

At step 815, the UE transmits a random access request in an LTE UL frequency band according to the system information. When the system information indicates random access resources in multiple LTE frequency bands, the UE may select a random access resource from one of the LTE frequency bands. The UE may generate a random access preamble according to the system information (e.g., the sequence and format information in the PRACH configuration). The UE may transmit the random access request in the form of a signal carrying the random access preamble.

At step 820, after transmitting the random access request, the UE monitors for a random access response from the BS in the NR frequency band, for example, during a random access response window.

At step 825, upon detecting the random access request, the BS determines the UL transmission timing associated with the UE and assigns a resource in an LTE UL frequency band to the UE.

At step 830, the BS transmits a random access response to the UE in the NR frequency band. The random access response may include UL timing adjustment information, the allocation of the resource in the LTE UL frequency band, and any other information (e.g., a temporary identifier for the UE) for subsequent connection establishment.

At step 835, upon receiving the random access response, the UE transmits a connection request according to the random access response, for example, using the assigned resource in the LTE UL frequency band.

At step 840, upon receiving the connection request, the BS may respond by transmitting a connection response in the NR frequency band. The connection response may provide configuration information specific to the UE. The configuration information may configure the UE to continue to use the same LTE UL frequency band for UL communications. Alternatively, the configuration information may reconfigure the UE to use another LTE UL frequency band or the NR frequency band for UL communications.

In some embodiments, the PRACH configuration may additionally include a specific NR frequency band for random access response monitoring. In some embodiments, an NR network may pair multiple LTE UL frequency bands with an NR frequency band. In some embodiments, the BS may allocate a resource for connection request transmission in an LTE UL frequency band different from the LTE UL frequency band in which the random access request is received. In some embodiments, the random access request, the random access response, the connection request, and the connection response may be referred to as message 1, message 2, message 3, and message 4, respectively. While the method 800 is described in the context of an NR network configured with random access resources in an LTE UL frequency band, the method 800 may be applied by an NR network using random access resources in an additional UL frequency band, which may or may not be shared by another network.

Figure 9:
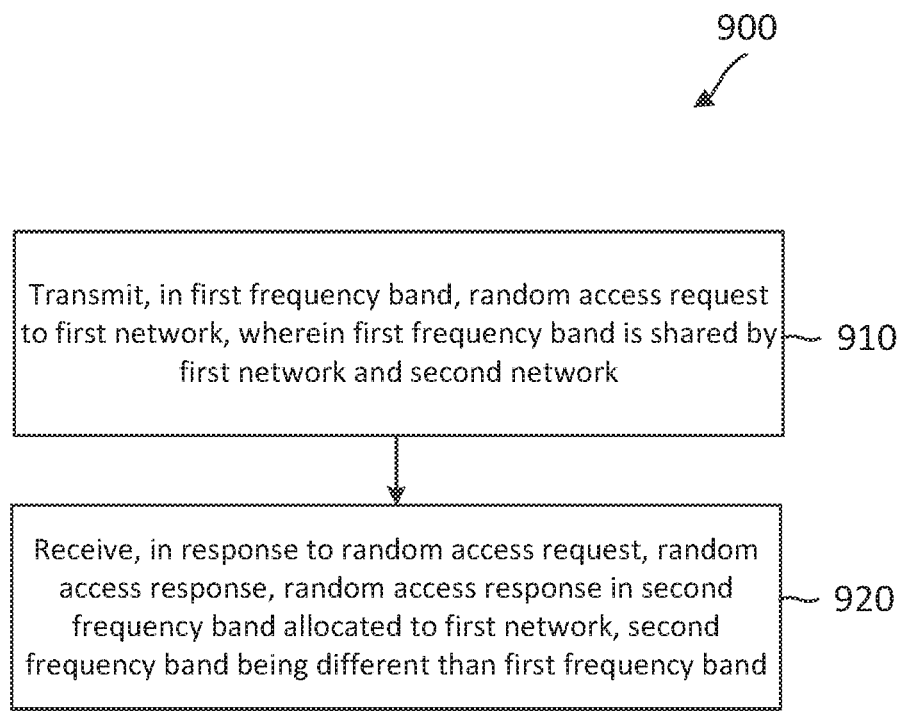
FIG. 9 is a flow diagram of a method of performing an initial network access to an NR network according to embodiments of the present disclosure.

FIG. 9 is a flow diagram of a method 900 of performing an initial network access to an NR network according to embodiments of the present disclosure. Steps of the method 900 can be executed by a computing device (e.g., a processor, processing circuit, and/or other suitable component) of a wireless communication device, such as the UEs 115 and 600. The method 900 may employ similar mechanisms in the methods 400, 500, and 800 described with respect to FIGS. 4, 5, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes transmitting, in a first frequency band, a random access request to a first network, where the first frequency band is shared by the first network and a second network. The wireless communication device may be a standalone NR UE. The first network may be an NR network. The second network may be an LTE network. The first frequency band may be an LTE UL frequency band (e.g., the LTE UL frequency bands 202) of the LTE network.

At step 920, the method 900 includes receiving, in response to the random access request, a random access response. The random access response is in a second frequency band allocated to the first network. The second frequency band is being different than the first frequency band. The second frequency band may be at substantially higher frequencies than the first frequency band. The second frequency band may be in the sub-6 GHz range or millimeter wave frequency range similar to the NR frequency band 206.

While the method 900 is described in the context of the first network using the first frequency band shared by the first network and the second network, the method 900 may be applied by a TDD network to use an additional UL frequency band. For example, the first network may operate in a TDD mode with UL and DL communications sent over the second frequency band (e.g., a primary operating frequency band) and additional UL communications sent over the first frequency band (e.g., a secondary operating frequency band). The first frequency band is shared with another network in some instances. In other instances, the first frequency band is not shared with another network.

Figure 10:
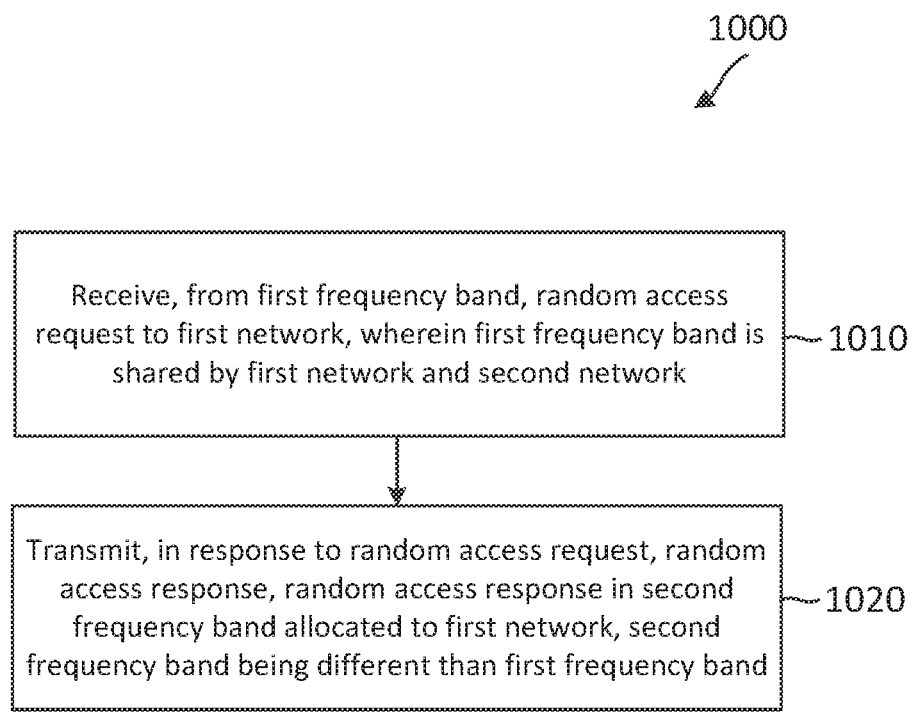
FIG. 10 is a flow diagram of a method of performing an initial network access to an NR network according to embodiments of the present disclosure.

FIG. 10 is a flow diagram of a method 1000 of performing an initial network access to an NR network according to embodiments of the present disclosure. Steps of the method 1000 can be executed by a computing device (e.g., a processor, processing circuit, and/or other suitable component) of a wireless communication device, such as the BSs 105 and 700. The method 1000 may employ similar mechanisms in the methods 400, 500, and 800 described with respect to FIGS. 4, 5, and 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving, from a first frequency band, a random access request to a first network, where the first frequency band is shared by the first network and a second network. The first network may be an NR network. The wireless communication device may be an NR BS of the NR network. The second network may be an LTE network. The first frequency band may be an LTE UL frequency band (e.g., the LTE UL frequency bands 202) of the LTE network.

At step 1020, the method 1000 includes transmitting, in response to the random access request, a random access response. The random access response is in a second frequency band allocated to the first network. The second frequency band is being different than the first frequency band. The second frequency band may be at substantially higher frequencies than the first frequency band. The second frequency band may be in the sub-6 GHz range or millimeter wave frequency range similar to the NR frequency band 206.

While the method 1000 is described in the context of the first network using the first frequency band shared by the first network and the second network, the method 1000 may be applied by a TDD network to use an additional UL frequency band. For example, the first network may operate in a TDD mode with UL and DL communications sent over the second frequency band (e.g., a primary operating frequency band) and additional UL communications sent over the first frequency band (e.g., a secondary operating frequency band). The first frequency band is shared with another network in some instances. In other instances, the first frequency band is not shared with another network.

In an embodiment of an NR UE initial access based on a RACH configuration for a supplementary uplink (SUL) carrier, a RACH configuration for the SUL carrier is broadcasted in RMSI. The configuration information for the SUL carrier is sufficient for UEs to complete a RACH procedure via the SUL carrier. In particular, the configuration information includes necessary power control parameters. The configuration information for the SUL carrier includes a threshold. The UE selects that SUL carrier for an initial access if the reference signal received power (RSRP) measured by the UE on the DL carrier where the UE receives RMSI is lower than the threshold. If the UE starts a RACH procedure on the SUL carrier, then the RACH procedure is completed with all uplink transmission taking place on that carrier. It is expected that the network may be able to request a connected-mode UE to initiate a RACH procedure towards any uplink carrier for path-loss and timing-advance acquisition.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising transmitting, by a first wireless communication device in a first frequency band, a random access request to a first network, wherein the first frequency band is shared by the first network and a second network; and receiving, by the first wireless communication device in response to the random access request, a random access response from a second wireless communication device of the first network, wherein the random access response is in a second frequency band allocated to the first network, the second frequency band being different than the first frequency band.

The method further comprises receiving, by the first wireless communication device, system information indicating a random access resource allocation in one or more frequency bands shared by the first network and the second network, wherein the one or more frequency bands include the first frequency band, and wherein the transmitting the random access request includes transmitting the random access request based on the random access resource allocation. The method further includes wherein the one or more frequency bands are uplink frequency bands of the second network. The method further includes wherein the receiving the system information includes receiving the system information in the second frequency band. The method further comprises transmitting, by the first wireless communication device to the second wireless communication device in the first frequency band, a connection request. The method further comprises receiving, by the first wireless communication device from the second wireless communication device, a configuration indicating an uplink allocation for the first wireless communication device in the second frequency band. The method further includes wherein the second frequency band is at a higher frequency than the first frequency band. The method further includes wherein the second network is a long-term evolution (LTE) network.

Embodiments of the present disclosure further include a method of wireless communication, comprising receiving, by a first wireless communication device from a second wireless communication device in a first frequency band, a random access request to a first network associated with the first wireless communication device, wherein the first frequency band is shared by the first network and a second network; and transmitting, by the first wireless communication device to the second wireless communication device in response to the random access request, a random access response, wherein the random access response is in a second frequency band allocated to the first network, the second frequency band being different than the first frequency band.

The method further comprises transmitting, by the first wireless communication device, system information indicating a random access resource allocation in one or more frequency bands shared by the first network and the second network, wherein the one or more frequency bands include the first frequency band, and wherein the receiving the random access request includes receiving the random access request based on the random access resource allocation. The method further includes wherein the one or more frequency bands are uplink frequency bands of the second network. The method further includes wherein the transmitting the system information includes transmitting the system information in the second frequency band. The method further comprises receiving, by the first wireless communication device from the second wireless communication device in the first frequency band, a connection request. The method further comprises transmitting, by the first wireless communication device from the second wireless communication device, a configuration indicating an uplink allocation for the first wireless communication device in the second frequency band. The method further includes wherein the second frequency band is at a higher frequency than the first frequency band. The method further includes wherein the second network is a long-term evolution (LTE) network.

Embodiments of the present disclosure further include an apparatus comprising a transceiver configured to transmit, in a first frequency band, a random access request to a first network, wherein the first frequency band is shared by the first network and a second network; and receive, in response to the random access request, a random access response from a second wireless communication device of the first network, wherein the random access response is in a second frequency band allocated to the first network, the second frequency band being different than the first frequency band.

The apparatus further includes wherein the transceiver is further configured to receive system information indicating a random access resource allocation in one or more frequency bands shared by the first network and the second network, wherein the one or more frequency bands include the first frequency band; and transmit the random access request based on the random access resource allocation. The apparatus further includes wherein the one or more frequency bands are uplink frequency bands of the second network. The apparatus further includes wherein the transceiver is further configured to receive the system information in the second frequency band. The apparatus further includes wherein the transceiver is further configured to transmitting, to the second wireless communication device in the first frequency band, a connection request. The apparatus further includes wherein the transceiver is further configured to receive, from the second wireless communication device, a configuration indicating an uplink allocation for the apparatus in the second frequency band. The apparatus further includes wherein the second frequency band is at a higher frequency than the first frequency band. The apparatus further includes wherein the second network is a long-term evolution (LTE) network.

Embodiments of the present disclosure further include an apparatus comprising a transceiver configured to receive, from a second wireless communication device in a first frequency band, a random access request to a first network associated with the apparatus, wherein the first frequency band is shared by the first network and a second network; and transmit, to the second wireless communication device in response to the random access request, a random access response, wherein the random access response is in a second frequency band allocated to the first network, the second frequency band being different than the first frequency band.

The apparatus further includes wherein the transceiver is further configured to transmit system information indicating a random access resource allocation in one or more frequency bands shared by the first network and the second network, wherein the one or more frequency bands include the first frequency band; and receive the random access request based on the random access resource allocation. The apparatus further includes wherein the one or more frequency bands are uplink frequency bands of the second network. The apparatus further includes wherein the transceiver is further configured to transmit the system information in the second frequency band. The apparatus further includes wherein the transceiver is further configured to receive, from the second wireless communication device in the first frequency band, a connection request. The apparatus further includes wherein the transceiver is further configured to transmit, from the second wireless communication device, a configuration indicating an uplink allocation for the apparatus in the second frequency band. The apparatus further includes wherein the second frequency band is at a higher frequency than the first frequency band. The apparatus further includes wherein the second network is a long-term evolution (LTE) network.

Embodiments of the present disclosure further include a computer-readable medium having program code recorded thereon, the program code comprising code for causing a first wireless communication device to transmit, in a first frequency band, a random access request to a first network, wherein the first frequency band is shared by the first network and a second network; and code for causing the first wireless communication device to receive, in response to the random access request, a random access response from a second wireless communication device of the first network, wherein the random access response is in a second frequency band allocated to the first network, the second frequency band being different than the first frequency band.

The computer-readable medium further comprises code for causing the first wireless communication device to receive system information indicating a random access resource allocation in one or more frequency bands shared by the first network and the second network, wherein the one or more frequency bands include the first frequency band, and wherein the code for causing the first wireless communication device to transmit the random access request is further configured to transmit the random access request based on the random access resource allocation. The computer-readable medium further includes wherein the one or more frequency bands are uplink frequency bands of the second network. The computer-readable medium further includes wherein the code for causing the first wireless communication device to receive the system information is further configured to receive the system information in the second frequency band. The computer-readable medium further comprises code for causing the first wireless communication device to transmit, to the second wireless communication device in the first frequency band, a connection request. The computer-readable medium further comprises code for causing the first wireless communication device to receive, from the second wireless communication device, a configuration indicating an uplink allocation for the first wireless communication device in the second frequency band. The computer-readable medium further includes wherein the second frequency band is at a higher frequency than the first frequency band. The computer-readable medium further includes wherein the second network is a long-term evolution (LTE) network.

Embodiments of the present disclosure further include a computer-readable medium having program code recorded thereon, the program code comprising code for causing a first wireless communication device to receive, from a second wireless communication device in a first frequency band, a random access request to a first network associated with the first wireless communication device, wherein the first frequency band is shared by the first network and a second network; and code for causing the first wireless communication device to transmit, to the second wireless communication device in response to the random access request, a random access response, wherein the random access response is in a second frequency band allocated to the first network, the second frequency band being different than the first frequency band.

The computer-readable medium further comprises code for causing the first wireless communication device to transmit system information indicating a random access resource allocation in one or more frequency bands shared by the first network and the second network, wherein the one or more frequency bands include the first frequency band, and wherein the code for causing the first wireless communication device to receive the random access request is further configured to receive the random access request based on the random access resource allocation. The computer-readable medium further includes wherein the one or more frequency bands are uplink frequency bands of the second network. The computer-readable medium further includes wherein the code for causing the first wireless communication device to transmit the system information is further configured to transmit the system information in the second frequency band. The computer-readable medium further comprises code for causing the first wireless communication device to receive, from the second wireless communication device in the first frequency band, a connection request. The computer-readable medium further comprises code for causing the first wireless communication device to transmit, from the second wireless communication device, a configuration indicating an uplink allocation for the first wireless communication device in the second frequency band. The computer-readable medium further includes wherein the second frequency band is at a higher frequency than the first frequency band. The computer-readable medium further includes wherein the second network is a long-term evolution (LTE) network.

Embodiments of the present disclosure further include an apparatus comprising means (e.g., the transceiver 610 and the antennas 616) for transmitting, in a first frequency band, a random access request to a first network, wherein the first frequency band is shared by the first network and a second network; and means (e.g., the transceiver 610 and the antennas 616) for receiving, in response to the random access request, a random access response from a second wireless communication device of the first network, wherein the random access response is in a second frequency band allocated to the first network, the second frequency band being different than the first frequency band.

The apparatus further comprises means (e.g., the transceiver 610 and the antennas 616) for receiving system information indicating a random access resource allocation in one or more frequency bands shared by the first network and the second network, wherein the one or more frequency bands include the first frequency band, and wherein the means for transmitting the random access request is further configured to transmit the random access request based on the random access resource allocation. The apparatus further includes wherein the one or more frequency bands are uplink frequency bands of the second network. The apparatus further includes wherein the means for receiving the system information is further configured to receive the system information in the second frequency band. The apparatus further comprises means (e.g., the transceiver 610 and the antennas 616) for transmitting, to the second wireless communication device in the first frequency band, a connection request. The apparatus further comprises means (e.g., the transceiver 610 and the antennas 616) for receiving, from the second wireless communication device, a configuration indicating an uplink allocation for the apparatus in the second frequency band. The apparatus further includes wherein the second frequency band is at a higher frequency than the first frequency band. The apparatus further includes wherein the second network is a long-term evolution (LTE) network.

Embodiments of the present disclosure further include an apparatus comprising means (e.g., the transceiver 710 and the antennas 716) for receiving, from a second wireless communication device in a first frequency band, a random access request to a first network associated with the apparatus, wherein the first frequency band is shared by the first network and a second network; and means (e.g., the transceiver 710 and the antennas 716) for transmitting, to the second wireless communication device in response to the random access request, a random access response, wherein the random access response is in a second frequency band allocated to the first network, the second frequency band being different than the first frequency band.

The apparatus further comprises means for transmitting (e.g., the transceiver 710 and the antennas 716) system information indicating a random access resource allocation in one or more frequency bands shared by the first network and the second network, wherein the one or more frequency bands include the first frequency band, and wherein the means for receiving the random access request is further configured to receive the random access request based on the random access resource allocation. The apparatus further includes wherein the one or more frequency bands are uplink frequency bands of the second network. The apparatus further includes wherein the means for transmitting the system information is further configured to transmit the system information in the second frequency band. The apparatus further comprises means (e.g., the transceiver 710 and the antennas 716) for receiving, from the second wireless communication device in the first frequency band, a connection request. The apparatus further comprises means (e.g., the transceiver 710 and the antennas 716) for transmitting, from the second wireless communication device, a configuration indicating an uplink allocation for the apparatus in the second frequency band. The apparatus further includes wherein the second frequency band is at a higher frequency than the first frequency band. The apparatus further includes wherein the second network is a long-term evolution (LTE) network.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a base station of a first network, system information indicating:
   a random access configuration indicating information for a random access request transmission,
   a lower frequency band, the lower frequency band used by the first network for uplink-only communications and also used for frequency-division duplexing (FDD) uplink communications of a radio access technology different from a radio access technology of the first network, and
   a higher frequency band, the higher frequency band designated to the first network for time-division duplexing (TDD) communications, the higher frequency band being at a higher frequency than the lower frequency band;
   transmitting, by the UE to the base station in the lower frequency band based on the random access configuration, the random access request; and
   receiving, by the UE from the base station in the higher frequency band in response to the random access request, a random access response.

2. The method of claim 1, the system information further indicating a plurality of lower frequency bands used by the first network for uplink-only communications, the plurality of lower frequency bands including the lower frequency band.

3. The method of claim 1, wherein the second network is a long-term evolution (LTE) network.

4. The method of claim 1, wherein the receiving the system information includes receiving the system information in the higher frequency band.

5. The method of claim 1, further comprising transmitting, by the UE to the base station in the lower frequency band, a connection request.

6. The method of claim 1, wherein the transmitting the random access request by the UE is in the lower frequency band instead of the higher frequency band to improve initial network access due to higher path loss in the higher frequency band than the lower frequency band.

7. A method of wireless communication, comprising:
   transmitting, by an base station of a first network, system information indicating:
   a random access configuration indicating information for a random access request transmission,
   a lower frequency band, the lower frequency band used by the first network for uplink-only communications and also used for frequency-division duplexing (FDD) uplink communications of a radio access technology different from a radio access technology of the first network, and
   a higher frequency band, the higher frequency band designated to the first network for time-division duplexing (TDD) communications, the higher frequency band being at a higher frequency than the lower frequency band;
   receiving, by the base station from a user equipment (UE) in the lower frequency band based on the random access configuration, a random access request; and
   transmitting, by the base station to the UE in the higher frequency band in response to the random access request, a random access response.

8. The method of claim 7, the system information further indicating a plurality of lower frequency bands used by the first network for uplink-only communications, the plurality of lower frequency bands including the lower frequency band.

9. The method of claim 7, wherein the second network is a long-term evolution (LTE) network.

10. The method of claim 7, wherein the transmitting the system information includes transmitting the system information in the higher frequency band.

11. The method of claim 7, further comprising receiving, by the base station from the UE in the lower frequency band, a connection request.

12. The method of claim 7, wherein the receiving the random access request by the base station is in the lower frequency band instead of the higher frequency band to improve initial network access due to higher path loss in the higher frequency band than the lower frequency band.

13. An apparatus comprising:
   a transceiver configured to:
   receive, from a base station of a first network, system information indicating:
   a random access configuration indicating information for a random access request transmission, a lower frequency band, the lower frequency band used by the first network for uplink-only communications and also used for frequency-division duplexing (FDD) uplink communications of a radio access technology different from a radio access technology of the first network, and a higher frequency band, the higher frequency band designated to the first network for time-division duplexing (TDD) communications, the higher frequency band being at a higher frequency than the lower frequency band;

transmit, to the base station in the lower frequency band based on the random access configuration, a random access request; and receive, from the base station in the higher frequency band in response to the random access request, a random access response.

14. The apparatus of claim 13, the system information further indicating a plurality of lower frequency bands used by the first network for uplink-only communications, the plurality of lower frequency bands including the lower frequency band.

15. The apparatus of claim 14, wherein the transceiver is further configured to receive the system information in the higher frequency band.

16. The apparatus of claim 15, wherein the transceiver is further configured to transmit, to the base station in the lower frequency band, a connection request.

17. The apparatus of claim 13, wherein the transmitting the random access request is in the lower frequency band instead of the higher frequency band to improve initial network access due to higher path loss in the higher frequency band than the lower frequency band.

18. An apparatus comprising:
a transceiver of a base station of a first network configured to:
transmit system information indicating:
a random access configuration indicating information for a random access request transmission,
a lower frequency band, the lower frequency band used by the first network for uplink-only communications and also used for frequency-division duplexing (FDD) uplink communications of a radio access technology different from a radio access technology of the first network, and
a higher frequency band, the higher frequency band designated to the first network for time-division duplexing (TDD) communications, the higher frequency band being at a higher frequency than the lower frequency band;
receive, from a user equipment (UE) in the lower frequency band, a random access request; and
transmit, to the UE in the higher frequency band in response to the random access request, a random access response.

19. The apparatus of claim 18, the system information further indicating a plurality of lower frequency bands used by the first network for uplink-only communications, the plurality of lower frequency bands including the lower frequency band.

20. The apparatus of claim 19, wherein the transceiver is further configured to transmit the system information in the higher frequency band.

21. The apparatus of claim 18, wherein the transceiver of the base station is further configured to receive, from the UE in the lower frequency band, a connection request.

22. The apparatus of claim 18, wherein the receiving the random access request is in the lower frequency band instead of the higher frequency band to improve initial network access due to higher path loss in the higher frequency band than the lower frequency band.

* * * * *